(12) United States Patent
Doutaz et al.

(10) Patent No.: US 9,267,800 B2
(45) Date of Patent: Feb. 23, 2016

(54) SYSTEM AND METHOD FOR ASSISTING THE DRIVER OF A BIOMECHANICALLY DRIVEN VEHICLE INCLUDING AT LEAST ONE WHEEL (75) Inventors: Jérôme Doutaz, Grenoble (FR); Stéphanie Riche, Grenoble (FR); Thimothée Jobert, Grenoble (FR)

(73) Assignees: MOVEA, Grenoble (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 274 days.

(21) Appl. No.: 13/513,684

(22) PCT Filed: Nov. 30, 2010

(86) PCT No.: PCT/EP2010/068517
§ 371 (c)(1),
(2), (4) Date: Aug. 17, 2012

(87) PCT Pub. No.: WO2011/067245
PCT Pub. Date: Jun. 9, 2011

(65) Prior Publication Data
US 2012/0310442 A1     Dec. 6, 2012

(30) Foreign Application Priority Data
Dec. 2, 2009   (FR) ...................................... 09 58597

(51) Int. Cl.
*G06F 19/00*     (2011.01)
*G01C 17/38*     (2006.01)
*G01C 21/12*     (2006.01)
*G01C 21/20*     (2006.01)
*G01C 22/00*     (2006.01)

(52) U.S. Cl.
CPC ................ *G01C 21/12* (2013.01); *G01C 21/20* (2013.01); *G01C 22/002* (2013.01)

(58) Field of Classification Search
None
See application file for complete search history.

(56) References Cited

U.S. PATENT DOCUMENTS 5,008,647 A * 4/1991 Brunt et al. .................... 340/432
5,177,432 A * 1/1993 Waterhouse et al. ......... 340/432

(Continued)

FOREIGN PATENT DOCUMENTS

EP      358320 B1 * 1/1994

OTHER PUBLICATIONS

International Search Report dated Mar. 30, 2011 and Written Opinion of the International Searching Authority issued in corresponding International Application No. PCT/EP2010/068517.

*Primary Examiner* — James Trammell
*Assistant Examiner* — Demetra Smith-Stewart
(74) *Attorney, Agent, or Firm* — Stroock & Stroock & Lavan LLP (57) ABSTRACT

A system for assisting a driver of a biomechanically-driven vehicle having at least one wheel (R), such as a bicycle, includes a device (DET1) for determining the speed of the vehicle, another device (DET) for determining the heading of the vehicle, a magnetometer (M) with at least two measurement axes for supplying data to determine the heading of the vehicle, and a device for supplying information relating to a movement of the vehicle, based on the speed of the vehicle, the slope of the rolling surface, and the heading of the vehicle.

19 Claims, 8 Drawing Sheets

(56) References Cited

U.S. PATENT DOCUMENTS

| | | | |
|---|---|---|---|
| 5,584,561 A * | 12/1996 | Lahos | 362/473 |
| 5,737,247 A * | 4/1998 | Baer et al. | 340/432 |
| 6,836,711 B2 * | 12/2004 | Gentilcore | 701/32.3 |
| 7,346,995 B2 * | 3/2008 | Olson | G01C 17/38 33/356 |
| 7,451,549 B1 * | 11/2008 | Sodhi et al. | 33/356 |
| 7,671,581 B2 * | 3/2010 | Noenen | 324/174 |
| 8,011,242 B2 * | 9/2011 | O'Neill et al. | 73/379.01 |
| 8,121,785 B2 * | 2/2012 | Swisher et al. | 701/423 |
| 8,664,948 B2 * | 3/2014 | Le Goff | B60C 23/06 324/207.25 |
| 8,677,640 B2 * | 3/2014 | Mayor et al. | 33/356 |
| 2003/0191567 A1 * | 10/2003 | Gentilcore | 701/35 |
| 2005/0043915 A1 * | 2/2005 | Ueda | 702/142 |
| 2007/0288166 A1 * | 12/2007 | Ockerse et al. | 701/224 |
| 2008/0053245 A1 * | 3/2008 | Yao | 73/862.08 |
| 2008/0284650 A1 * | 11/2008 | MacIntosh et al. | 342/357.14 |
| 2009/0063049 A1 | 3/2009 | Swisher et al. | |
| 2010/0024590 A1 * | 2/2010 | O'Neill et al. | 74/594.1 |
| 2010/0135604 A1 * | 6/2010 | Ozaki et al. | 384/448 |
| 2011/0098928 A1 * | 4/2011 | Hoffman et al. | 702/5 |

\* cited by examiner

SYSTEM AND METHOD FOR ASSISTING THE DRIVER OF A BIOMECHANICALLY DRIVEN VEHICLE INCLUDING AT LEAST ONE WHEEL

CROSS-REFERENCE TO RELATED APPLICATIONS

This application is a national phase application under 35 U.S.C. §371 of PCT/EP2010/068517, filed Nov. 30, 2010, which claims priority to French Patent Application No. 0958597, filed Dec. 2, 2009, the entire contents of which are expressly incorporated herein by reference.

FIELD OF THE INVENTION

The present invention relates to a system and a method for assisting the driver of a biomechanically-driven vehicle comprising at least one wheel.

BACKGROUND OF THE INVENTION

One of the results of the increase in everyday mobility and urban sprawl is that individuals are having to travel through spaces whose geography they are not necessarily familiar with. Also, driving assistance devices based on geolocation and navigation have proliferated over a number of years.

Like satellite guidance systems, these devices enable the individuals in cars, on a motorbike, on a scooter or on foot to move around with full knowledge of where they are located, and knowing what path to take to get from one point to another. The individuals are thus no longer lost and can even optimize their journey by having themselves guided over routes that are faster, less costly, or include services such as a gas station or a hospital.

The best known and most widely used guidance systems are the satellite guidance systems that use information transmitted by a satellite geolocation system, or GPS (Global Positioning System), which currently offers an accuracy of 15 to 100 meters for the mass market systems and requires the use of a GPS chip which has the drawback of having a high consumption of electrical energy to receive the signals from the satellites. Also, before starting, it is usually necessary to wait for the GPS to find the initial position and compute the route, which may take a few minutes. Furthermore, this type of system is not well suited to vehicles such as bicycles or scooters, which can take small paths not referenced on the maps of such systems.

There are also location systems that use global system for mobile communication, or GSM, has allowed the expansion of cell phone guidance services. The accuracy of positioning by GSM can range from 200 meters to several kilometers, depending on the type of place where the user is located, for example in an urban environment where the density of antennas is high, or in a rural environment where the density of antennas is low. The GSM method most commonly used is the one based on the cell identifiers, or cell ID, representative of the antennas. This method entails recovering the identifiers of the GSM antennas to which the terminal is connected. A database then establishes the link between the identifiers of the cells and the geographic positions of the antennas, and the mobile terminal is capable of estimating its position. The major drawbacks to this solution are the lack of accuracy and the need for a network connection to recover the information from the cells, which consumes electrical energy. Similarly, location by WIFI is possible but presents drawbacks similar to guidance by GSM; they also suffer from as yet incomplete coverage.

It is also known practice to use the radio frequency identification, or RFID, technology, can be used for geolocation inside buildings. A series of RFID tag readers equipped with different types of antennas are positioned in such a way as to cover all the desired area. This area is then subdivided into portions whose area varies according to the number of readers deployed and their power. When a person equipped with an active RFID tag is located in a part of the area, the system is capable of computing his or her position based on the number of readers which detect the RFID tag by referring to the pre-established subdivision scheme. In real time, this technique is relatively approximate and its accuracy primarily makes it possible to determine the room or the corridor in which the geolocated person is located. A major drawback with this solution is the need to deploy the RFID tags over all the places where the users are to be located.

Other systems, as illustrated in the French patent application FR 05 13269 are based on the use of inertial units which comprise sensors of accelerometer, gyroscope and magnetometer types. By merging data from these sensors, these systems estimate the orientation in three dimensions of the inertial unit. However, the measurements made by an inertial unit exhibit a significant time drift.

All these systems are high consumers of electrical energy, which is not compatible with use for biomechanically-driven vehicles, which have little or nothing in the way of energy reserves. Furthermore, some of these systems, dependent on a communication system, can also afford traceability of the individuals without their knowledge.

The present invention aims to overcome the problems cited above.

SUMMARY OF THE INVENTION

According to one aspect of the invention, there is proposed a system for assisting the driver of a biomechanically-driven vehicle comprising at least one wheel, characterized in that it comprises:
  first means for determining the speed of the vehicle;
  second means for determining the heading of the vehicle;
  a magnetometer with at least two measurement axes supplying data for determining the heading of the vehicle; and
  means for supplying information relating to a movement of the vehicle, based on the speed of the vehicle, the slope of the rolling surface, and the heading of the vehicle.

Such a system can be used for any biomechanically-driven vehicle comprising at least one wheel, such as a bicycle, a scooter, or a sled, that does not have any significant energy reserve such as an electric battery, because it does not continuously, or significantly, use any communication network, but is still very accurate.

In one embodiment, said second determination means are also suitable for determining the slope of the rolling surface.

Thus, the accuracy of the system is enhanced.

According to one embodiment, said first determination means comprise said magnetometer, and said wheel of the vehicle is provided with a magnetic signature representative of the perimeter of said wheel of the vehicle.

The expression magnetic signature should be understood to mean characteristics of the magnetic signals representative of the presence of the type or of the identity of an object.

As a variant, said first determination means comprise said magnetometer and magnetic means for creating a magnetic signature of said wheel of the vehicle. For example, said magnetic means comprise at least one magnet provided with fastening means designed to be fastened onto said wheel of the vehicle, in proximity to the rim.

Thus, it is possible to determine, in a number of ways, the speed of the vehicle accurately and inexpensively.

Said first means for determining the speed of the vehicle may comprise means for learning and/or for recognizing the magnetic signature of said wheel of the vehicle.

Learning is an acquisition of knowledge, and recognition is the capacity to recognize or detect something. These terms are applied to the magnetic signature of the wheel of the vehicle.

Thus, simply and inexpensively, the system can detect each wheel revolution, associate with it the distance travelled on the basis of the perimeter of the wheel, and deduce therefrom the speed of the vehicle.

For example, said first means for determining the speed of the vehicle comprise means for detecting spikes on the signals from the measurement axes of said magnetometer, based on detections of local extrema of said measurement signals and on an amplitude threshold.

It is thus possible to compare the wheel revolutions simply and inexpensively.

As a variant, said second determination means may comprise said magnetometer and a gyroscope.

In one embodiment, said means for supplying information relating to the movement of the vehicle comprise a cartographic device, said system also comprising third means for determining a point of departure and a point of arrival of the vehicle.

Thus, to guide the driver of the vehicle, the means used are perfectly suited.

Said third determination means may comprise a display screen, stored geographic maps, and means for the user to directly select points of departure and of arrival on said maps.

Thus, the points of departure and of arrival may, for example, be directly entered by the user, on the display screen by means of command buttons, or directly on the screen if the latter is a touch screen. The stored geographic maps can be downloaded via a communication network.

Said third determination means may comprise a receiver of data delivered by a satellite navigation system to determine a point of departure.

Notably when the system is already equipped with a satellite geolocation system chip, such as a GPS chip, it is then possible to use it alone to accurately determine the point of departure, which consumes communication electrical energy only occasionally, and makes it possible to significantly limit the discharging of the battery and thus enhance the energy autonomy of the system.

As a variant, said third determination means comprise a receiver of data delivered by a fixed device with short-distance transmission to determine a point of departure.

In practice, a receiver of data delivered by a fixed device with short-distance transmission, such as a WIFI terminal, an RFID terminal, or a self-service bicycle-type terminal. Since the transmission is short-distance, the system accurately knows the situation at that instant.

According to one embodiment, said first determination means also comprise first means for correcting the signals from the measurement axes supplied by said magnetometer, based on an estimation of the magnetic disturbances due to the vehicle.

The accuracy of the system is thus enhanced.

In one embodiment, said second determination means comprise a triaxial accelerometer.

The use of a triaxial accelerometer is inexpensive with excellent accuracy.

According to one embodiment, said second determination means also comprise second means for correcting the signals from the measurement axes supplied by said accelerometer, based on an estimation of the specific acceleration of the vehicle.

Thus, the accuracy of the system is enhanced.

The system may also comprise an external device for fastening said system onto the vehicle, in proximity to said wheel.

Thus, the vehicle, for example a bicycle, can be provided with this external fastening device, which remains fastened onto the bicycle, and thus avoids having to redo the calibrations of the system each time the bicycle is used.

There is also proposed a cell phone comprising an integrated system as claimed in one of the preceding claims.

In practice, the system can be integrated in a cell phone.

According to another aspect of the invention, there is also proposed a method for assisting the driver of a biomechanically-driven vehicle comprising at least one wheel, characterized in that it comprises:

determining the speed of the vehicle;
determining the heading of the vehicle;
receiving measurements from a magnetometer with at least two measurement axes, to determine the heading of the vehicle; and
supplying information relating to a movement of the vehicle, based on the speed of the vehicle, the slope of the rolling surface, and the heading of the vehicle.

Furthermore, the method may comprise a step of determining the slope of the rolling surface.

There is also proposed a computer programme implementing this method.

Thus, this programme may be downloadable to mobile terminals such as cell phones, and operate directly on this hardware.

According to another aspect of the invention, there is also proposed a kit comprising a computer programme as described previously, at least one magnet provided with fastening means designed to be fastened onto a wheel of a vehicle, in proximity to the rim, and an external device for fastening said system onto the vehicle, in proximity to said wheel.

DRAWINGS OF THE INVENTION

The invention will be better understood on studying a few embodiments described as nonlimiting examples and illustrated by the appended drawings in which.

In the different figures, the elements that have the same references are identical.

DETAILED DESCRIPTION

Figure 1:
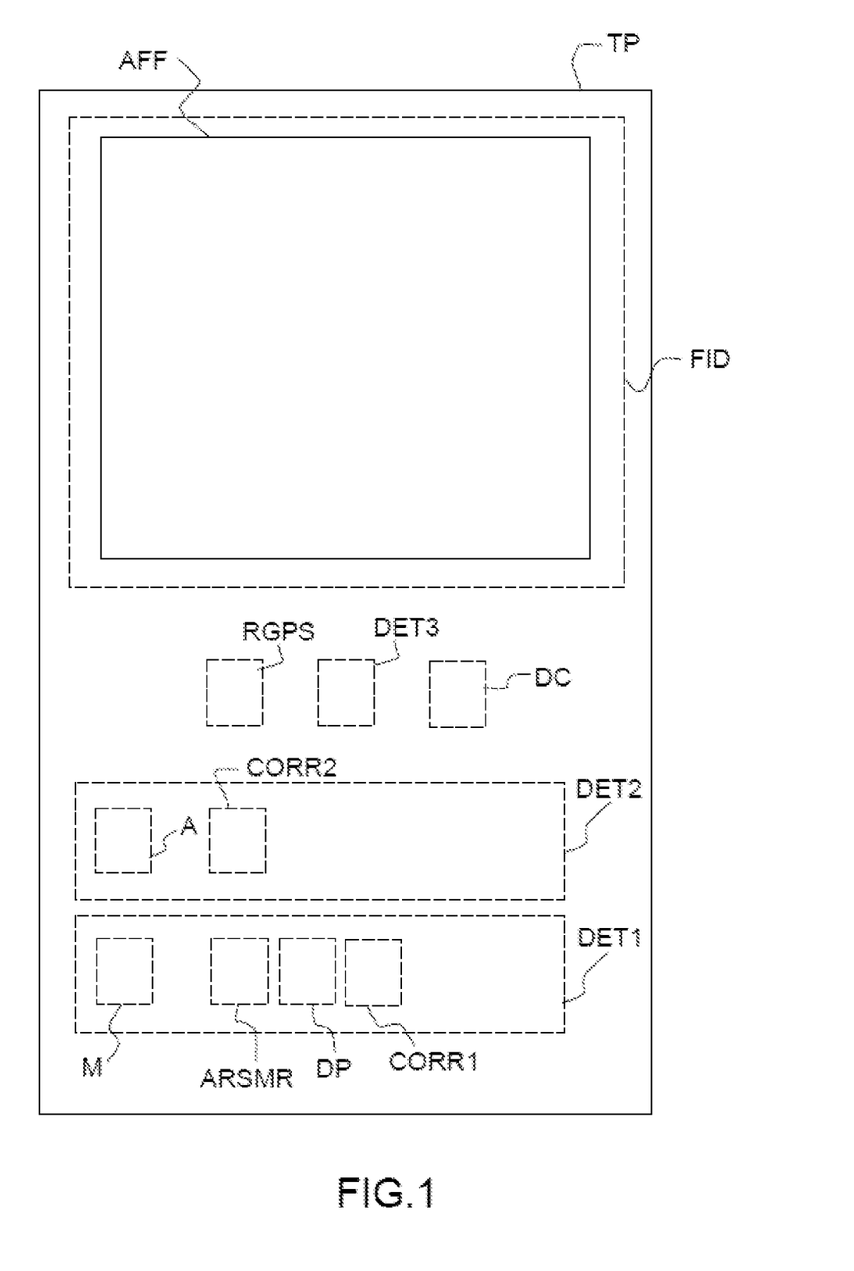
FIG. 1 illustrates an embodiment of a system according to one aspect of the invention.

FIG. 1 shows a system according to one aspect of the invention, in the case where it is integrated into a cell phone TP provided with a display screen AFF. The invention may, however, apply to any system comprising a dedicated module or one that is shared with other uses, but hereinafter in the description, the example will be described with a cell phone TP.

Furthermore, hereinafter in the description, the biomechanically-driven vehicle comprising at least one wheel is a bicycle, even though the invention applies to any type of biomechanically-driven vehicle comprising at least one wheel, such as a scooter, a sled drawn by a horse, or a tricycle.

The cell phone TP comprises a first module DET1 for determining the speed of the bicycle, a second module DET2 for determining the slope of the rolling surface and the heading of the bicycle. The heading of a moving body is the direction toward which it is orientated. It is the angle expressed in degrees (from 0 to 360°), in the clockwise direction, between its lubber line, i.e. its longitudinal axis, and north.

A magnetometer M, with at least two measurement axes, supplies data that can notably be used to determine the heading of the bicycle. Furthermore, a module FID supplies information relating to the movement of the bicycle.

The first module DET1 for determining the speed of the bicycle may, for example, comprise the magnetometer M when the wheel of the bicycle is provided with a predetermined magnetic signature representative of the wheel and therefore of its perimeter.

If the wheel does not have any magnetic signature, the first determination module DET1 may then comprise a means for creating a magnetic signature of the wheel of the bicycle, for example by one or more magnets AIM that can be fastened by suitable fastening means, for example by gluing or screwing, in proximity to the rim.

A module ARSMR for learning and recognizing the magnetic signature of the wheel makes it possible to learn the signature of the wheel, and/or to recognize the magnetic signature of the wheel, in order to be able to count the wheel revolutions thereof and deduce therefrom the distance travelled, or even also the speed, the diameter of the wheel being able to be supplied to the system or preselected in a predetermined list.

The first determination module DET1 may also comprise a module DP for detecting spikes on the signals from the measurement axes of the magnetometer M, based on detections of local extrema of said measurement signals and on an amplitude threshold.

The addition of a magnet onto the wheel of a bicycle and the movement of this assembly creates an oscillating magnetic signal. This signal, once processed, makes it possible to detect a wheel revolution. However, this signal is disturbing for computing the orientation.

To take account of the magnetic disturbances linked to the use of the magnet or of the magnetic dipole on the wheel, we base our work on the norm of magnetic field, denoted $\|B\|$. Working on the norm makes it possible to disregard the signal variations due to the variations of the orientation of the sensor in the earth's magnetic field.

If a period T of the signal is defined, between two magnetic field maxima (variation of the angle $\theta_2$ represented in FIG. 3 between $[\times 3\pi/2; \pi/2]$), the signal that is useful for computing the orientation (direction and inclination) is situated between $[-5\pi/4; \pi/4]$.

Figure 3:
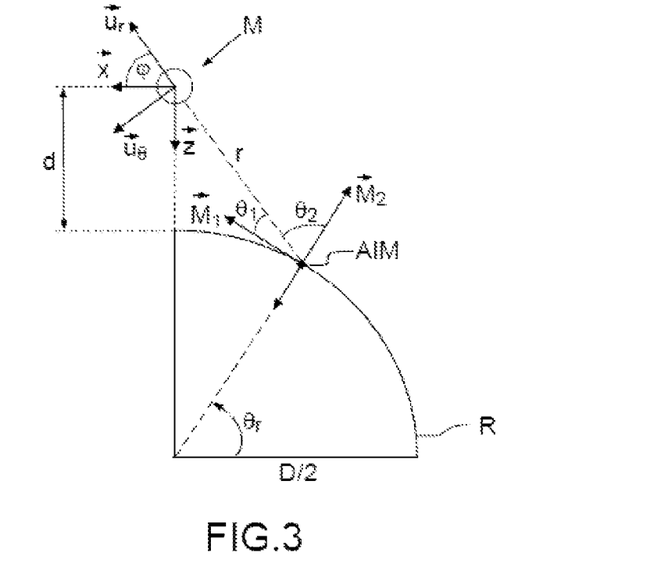
FIG. 3 illustrates the physical quantities used in the embodiment of FIG. 2.

Therefore, when two maxima are detected, it is sufficient to extract the useful signal in order to use it for the rest of the computations.

The module FID supplying information relating to the movement of the vehicle may comprise, for example, a cartographic device DC, and the cell phone TP may also comprise a third module DET3 for determining a point of departure and a point of arrival of the vehicle, for example using a touch interface such as the screen AFF of the cell phone TP. For example, the third determination module DET3 may comprise a receiver RGPS of data delivered by a satellite navigation system, such as GPS, to determine a point of departure, accurately.

The first determination module DET1 may also comprise a first module CORR1 for correcting the measurements supplied by the magnetometer M based on an estimation of the magnetic disturbances due to the vehicle.

The second module DET2 for determining the slope of the rolling surface and the heading of the bicycle comprises, for example, a triaxial accelerometer A, and a second module CORR2 for correcting the signals from the measurement axes supplied by the accelerometer A, based on an estimation of the specific acceleration of the bicycle.

An external device for fastening the cell phone onto the bicycle, in proximity to the wheel, for example on the handlebar grip, may be provided, which makes it possible not to have to calibrate the system each time the bicycle is used.

As a variant, the second determination module DET2 may comprise the magnetometer M and a gyroscope or any apparatus making it possible to perform a measurement of the rotation of its housing relative to an absolute coordinate system. It is thus possible to obtain the variations of orientation of the housing the gyroscope. An estimation of the attitude is thus obtained which does not depend on a measurement of a physical quantity that can be disturbed, such as, the magnetic field by a magnetic disturbance or the field of gravity by a specific acceleration of the measurement means. However, without correction, the orientation given by the gyroscope quickly exhibits drift, that a magnetometer can compensate.

Such a system according to the invention can provide the user with numerous services.

In practice, it can be used to guide the user in a trip that he wants to make, while consuming very little electrical energy; it can give the user a lot of information on his or her trip, such as changes of speed, the power supplied by the cyclist, the energy spent, the topography of the trip, and even use this information to give advice in real time or after the trip so that it is enhanced. It can even be used to recognize falls, for example to trigger the sending of a distress signal by SMS in cases of prolonged inactivity of the bicycle after a fall.

Figure 2:
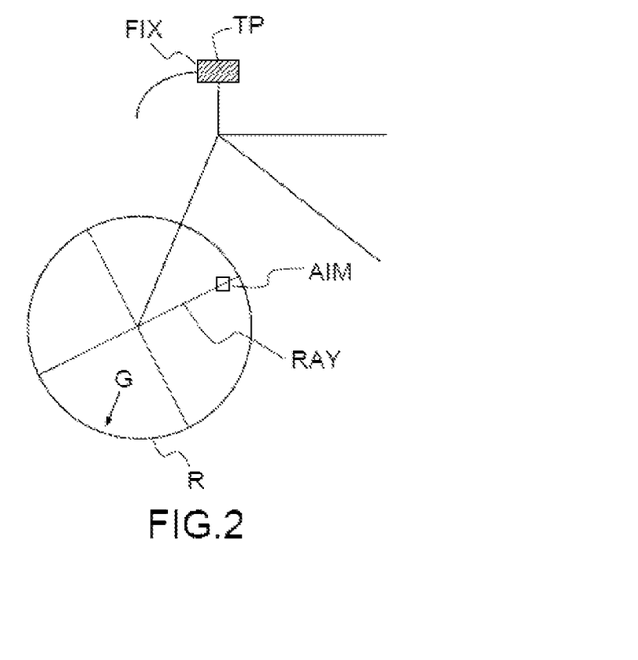
FIG. 2 illustrates an exemplary use of a system according to one aspect of the invention.

FIG. 2 illustrates the front of a bicycle on which a cell phone TP is fastened, arranged in an external fastening device FIX mounted fixedly on the handlebar grip of the bicycle, a magnet AIM being fixedly mounted on a spoke RAY of the wheel R, in proximity to the rim G.

The magnet AIM of FIG. 2 is oriented so as to have a maximum magnetic field measured by one of the axes of the magnetometer M. Hereinafter in the description, the magnetometer M is triaxial. By fastening it in proximity to the rim G of the wheel R, a minimum distance Dmin is obtained between the magnetometer M and the magnet AIM that is as short as possible, and a maximum distance Dmax is obtained between the magnetometer M and the magnet AIM that is as long as possible, so as to have the greatest possible amplitude of the magnetic signal measured by the magnetometer M. The detection of passage of the magnet in proximity to the magnetometer M when the wheel R revolves is thus facilitated.

FIG. 3 shows the physical quantities used in the embodiment case of FIG. 2, when the magnet AIM is in contact with the rim G.

By defining the following quantities:
r represents the current distance separating the magnet from the magnetometer M, in m,
d represents the minimum distance separating the magnet from the magnetometer M, in m,
D represents the diameter of the wheel, R in m,
$\vec{x}$ represents the measurement axis x of the magnetometer M,
$\vec{z}$ represents the measurement axis z of the magnetometer M,
$\vec{u}_r$ represents the direction between the magnet AIM and the magnetometer M,
$\vec{u}_\theta$ represents the direction normal to $\vec{u}_r$ in the counterclockwise direction,
$\theta_r$ represents the angle of rotation of the wheel R, in rad,
$\varphi$ represents the angle between $\vec{u}_r$ and $\vec{x}$, in rad,
$\vec{M}_1$ represents the magnetic moment of the magnet AIM according to a first orientation named "orientation 1", in A·m²,
$\vec{M}_2$ represents the magnetic moment of the magnet AIM according to a second orientation named "orientation 2", in A·m²,
$\theta_1$ represents the angle between $\vec{M}_1$ and $\vec{u}_r$, in radians
$\theta_2$ represents the angle between $\vec{M}_2$ and $\vec{u}_r$, in radians.
The following relationships apply:

$$r = \sqrt{\left(\frac{D}{2}+d\right)^2 + \left(\frac{D}{2}\right)^2 + 2\left(\frac{D}{2}+d\right)\left(\frac{D}{2}\right)\sin(\theta_r)}$$

$$\varphi = a\cos\left(\frac{D}{2r}\cos(\theta_r)\right)$$

$$\theta_1 = \varphi + \theta_r - \frac{\pi}{2}$$

$$\theta_2 = \pi - \varphi - \theta_r$$

$$\vec{B} = \frac{\mu_0 m}{4\pi r^3}(2\cos(\theta)\vec{u}_r + \sin(\theta)\vec{u}_\theta)$$

$$\vec{u}_r = \cos(\varphi)\vec{x} - \sin(\varphi)\vec{z}$$

$$\vec{u}_\theta = \sin(\varphi)\vec{x} + \cos(\varphi)\vec{z}$$

$$B_x = \frac{100m}{r^3}(2\cos(\theta)\cos(\varphi) - \sin(\theta)\sin(\varphi))$$

$$B_z = \frac{100m}{r^3}(-2\cos(\theta)\sin(\varphi) + \sin(\theta)\cos(\varphi))$$

FIGS. 4a, 4b, 4c, 4d respectively represent the magnetic field measured by the axis x and z of the magnetometer M for the orientation 1 of the magnet AIM, and the magnetic field measured by the axis x and z of the magnetometer M for the orientation 2 of the magnet AIM, when D=0.66 m, d=0.5 m, m=3.402 A·m², m representing the norm of the magnetic moment of the magnet AIM.

The variations of the measurement signals from the magnetometer M are of the order of 10 to 15% of the amplitude of the earth's magnetic field. These variations are maximized for the second orientation of the magnet, depending on the shape of the magnet AIM and corresponding to the second magnetic moment $\vec{M}_2$ in FIG. 3, known as a function of the shape of the magnet AIM, by observing the field on the axis z of the magnetometer M, usually oriented downward by construction.

The optimization of the variations of the signals makes it possible to make them more easily detectable relative to the other variations that the magnetic field measured by the magnetometer M may undergo.

The form of the magnetic signal of the magnet is known a priori as a function of the characteristics of the magnetic, such as its form, and it is also possible to limit the detection, so as to eliminate the small, insignificant signal variations, and also the excessively wide variations due to magnetic objects other than the magnet AIM in proximity to the magnetometer M.

Figure 4A:
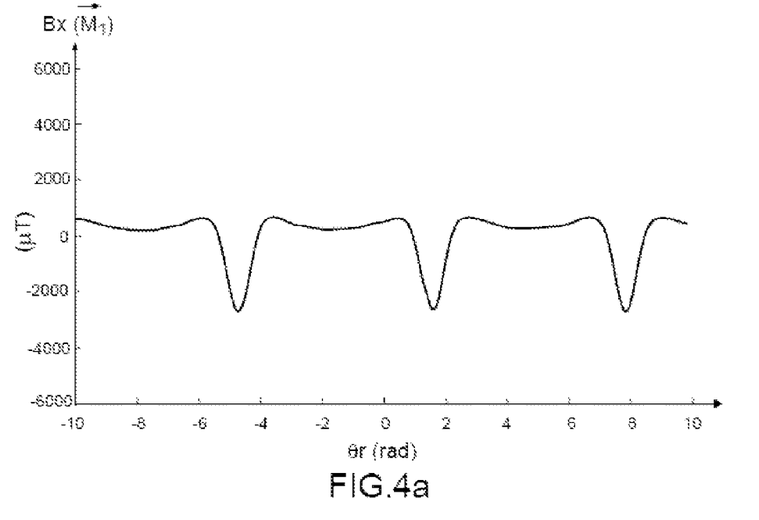
FIGS. 4a, 4b, 4c, 4d, 4e and 4f illustrate the variations of magnetic field as a function of different implementation parameters, according to aspects of the invention.
Figure 4B:
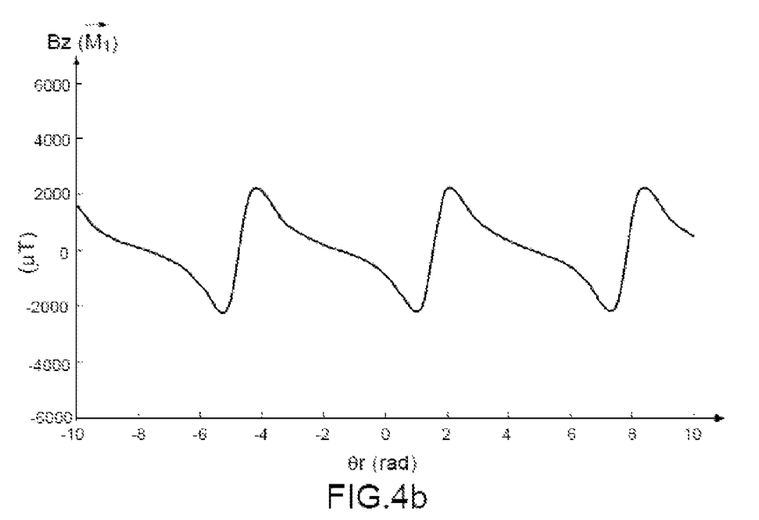
Figure 4C:
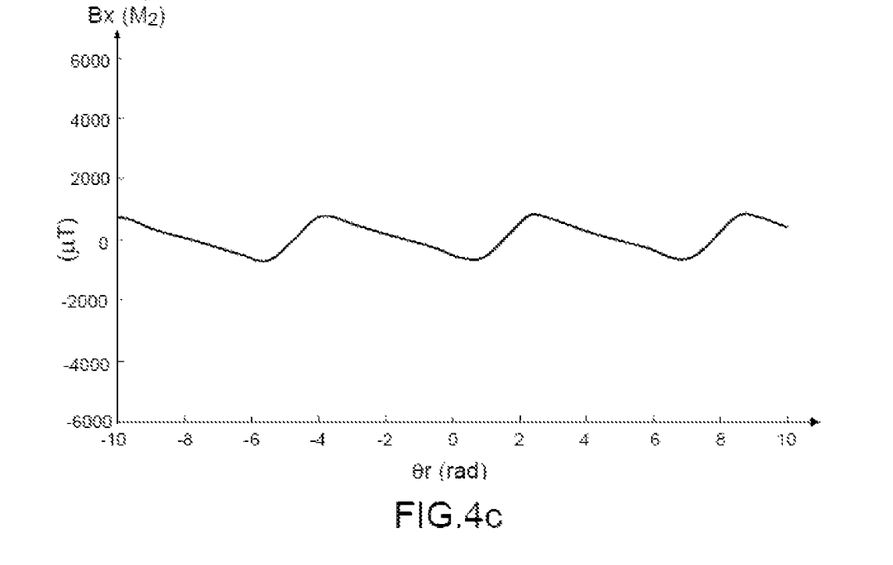
Figure 4D:
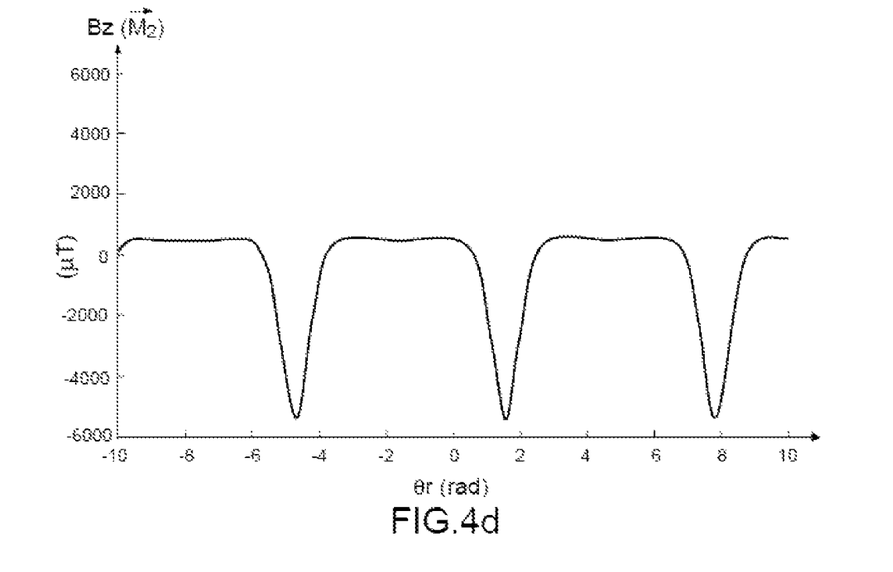
Figure 4E:
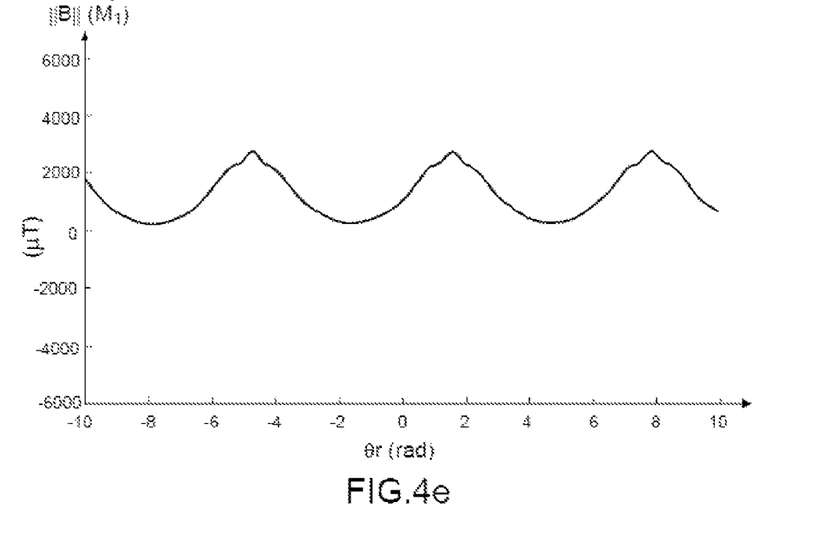
Figure 4F:
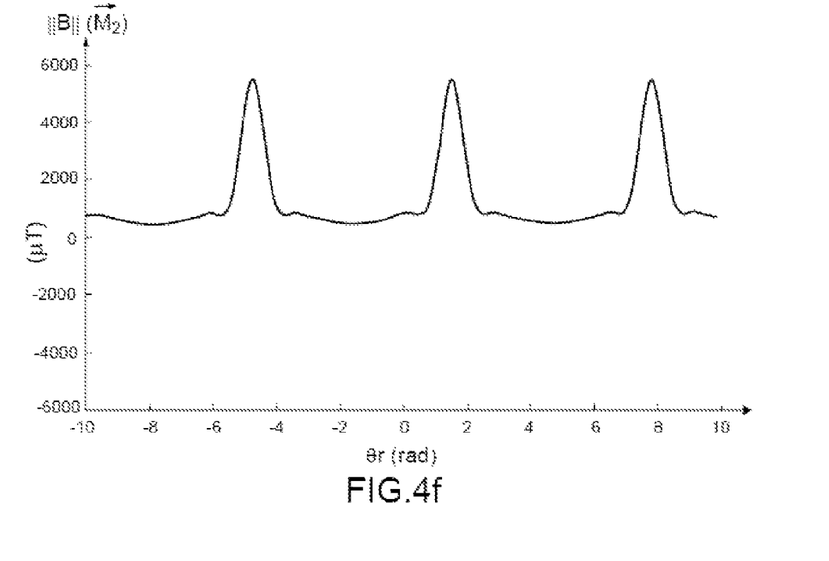

As a variant, a norm ||B|| of the magnetic field B can be used, for the moment $\vec{M}_1$ and $\vec{M}_2$ of FIG. 3. The use of a norm makes it possible to disregard the variations of the magnetic field linked to the change of orientation of the magnetometer M in the earth's magnetic field. An example obtained from the measurements of the magnetometer M is illustrated in FIGS. 4e and 4f.

Figure 5A:
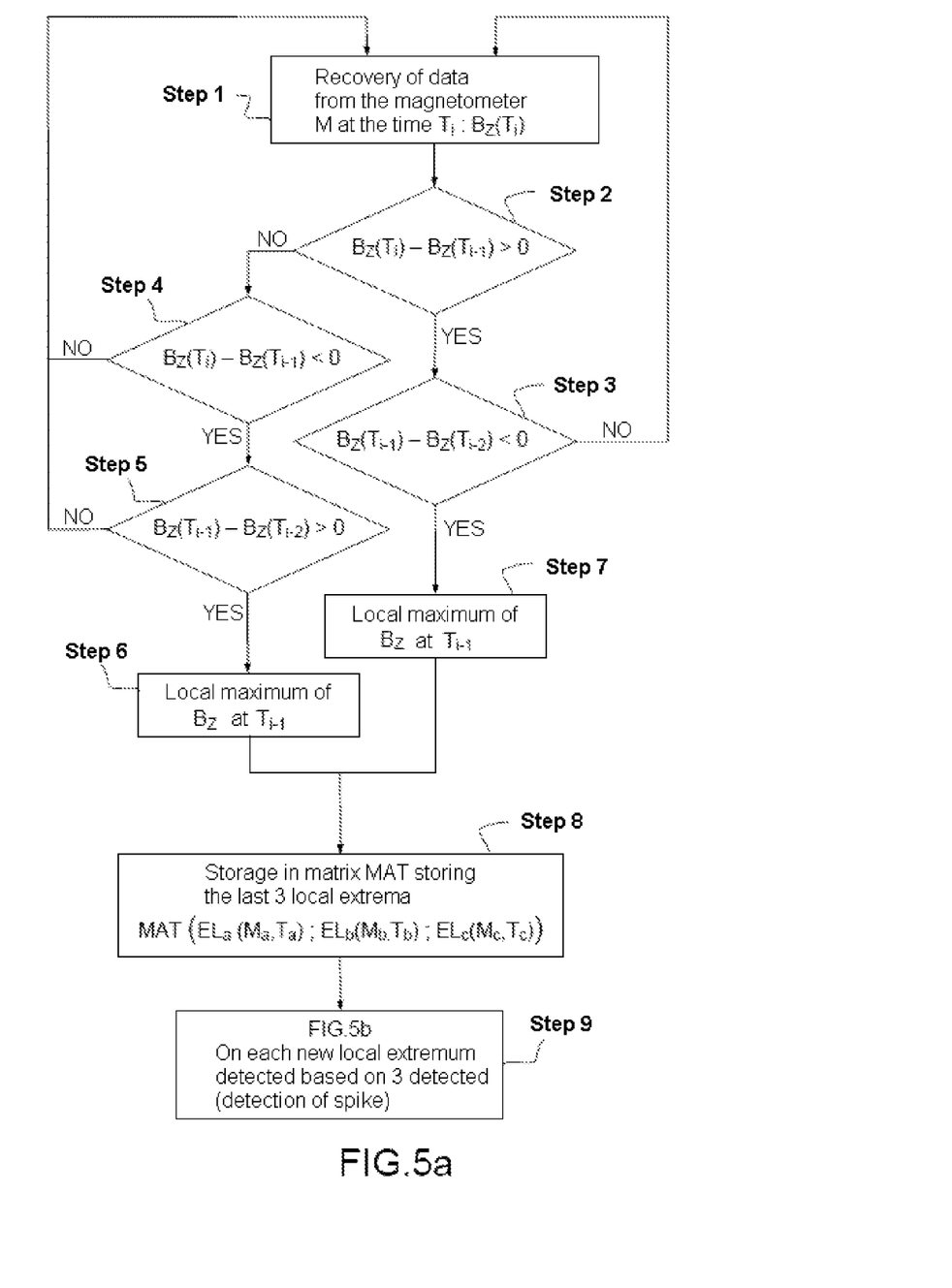
FIGS. 5a and 5b illustrate the detection of bicycle wheel revolutions, according to one aspect of the invention.
Figure 5B:
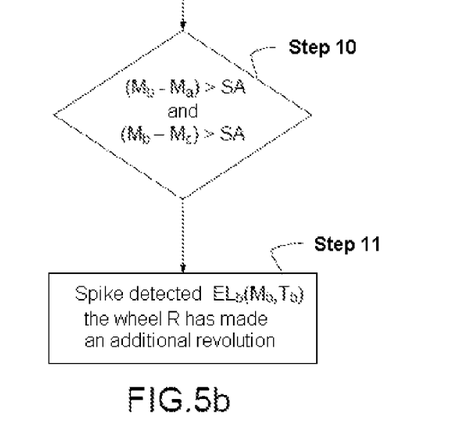
Figure 6:
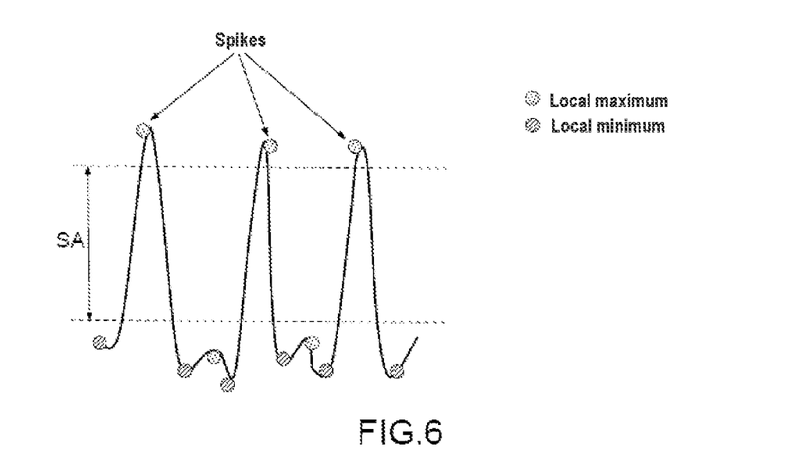
FIG. 6 illustrates detecting spikes corresponding to a passage of a magnet past a magnetometer.

The module DP for detecting spikes implements, for example, the algorithm described by FIGS. 5a and 5b, which is used to detect the spikes corresponding to a passage of the magnet AIM close to the magnetometer M, i.e., a wheel revolution since the last passage, based on the local extrema of the signal, illustrated in FIG. 6.

At a measurement instant $T_i$, the measurements transmitted by the magnetometer M are recovered, and the value of the magnetic field Bz measured along the axis z, is taken into account in a step 1. Obviously, as a variant, depending on the orientation of the magnet AIM, it is possible to take Bx instead of Bz, or even the norm ||B|| of the magnetic field B, if the aim is to disregard the variations of the signal due to the variations of orientation. Then, in a step 2, a test is made to see if the variation $Bz(T_i)-Bz(T_{i-1})$ of the magnetic field Bz between the last two measurements transmitted by the magnetometer M at the instants $T_{i-1}$ and $T_i$ is strictly positive, and if it is, i.e. if the test is positive, in a step 3, a test is made to see if the preceding variation $Bz(T_{i-1})-Bz(T_{i-2})$ of the magnetic field Bz between the last two preceding measurements transmitted by the magnetometer M at the instants $T_{i-21}$ and is strictly negative. If the result of the test of the step 2 is negative, i.e. if the variation $Bz(T_i)-Bz(T_{i-1})$ is strictly positive or null, in a step 4, a test is made to see if the variation $Bz(T_i)-Bz(T_{i-1})$ is strictly negative, and if it is, i.e. if the test is positive, in a step 5, a test is made to see if the preceding variation $Bz(T_{i-1})-Bz(T_{i-2})$ is strictly positive. In the case of a negative response to the tests of the steps 3, 4 and 6, the algorithm loops to the step 1 at the next measurement instant.

In the case of a positive response to the test of the step 5, a local maximum of Bz is detected in a step 6, and in the case of a positive response to the test of the step 3, a local minimum of Bz is detected in a step 7.

When a local maximum or a local minimum is detected in the steps 6 or 7, this extremum is stored, in a step 8, in a matrix MAT storing the last three local extrema from the moment when the first three extrema have been detected. The matrix MAT can be expressed in the following form: MAT ($EL_a$ ($M_a$, $T_a$); $EL_b$ ($M_b$, $T_b$); $EL_c$ ($M_c$, $T_c$))

Also, when a new extrema detection is performed in the step 6 or 7, and the matrix MAT is updated to contain the coordinates of the last three local extrema, in chronological order, in a step 9, a spike detection is triggered, as illustrated in FIG. 5b, in order to determine whether the local extremum $EL_b$ is a spike corresponding to the passage of the magnet AIM in proximity to the magnetometer M, which corresponds to a revolution of the wheel R since the last passage of the magnet AIM in proximity to the magnetometer M.

In this case, in a step 10, a comparison test is performed in relation to a positive amplitude threshold SA, to test whether the deviation $M_b-M_a$ between the values of the magnetic field Bz of the first local extremum $EL_a$ and of the second local extremum $EL_b$ stored in the matrix MAT is greater than the amplitude threshold SA, and whether the deviation $M_b-M_c$ between the values of the magnetic field Bz of the third local extremum $EL_c$ and of the second local extremum $EL_b$ stored in the matrix MAT is greater than the amplitude threshold SA.

If the result of the test of the step 10 is positive, a spike is detected at the extremum $EL_b$ ($M_b$, $T_a$).

The second module DET2 for determining the slope of the rolling surface and the heading of the bicycle can, for example, be performed as follows.

Figure 7:
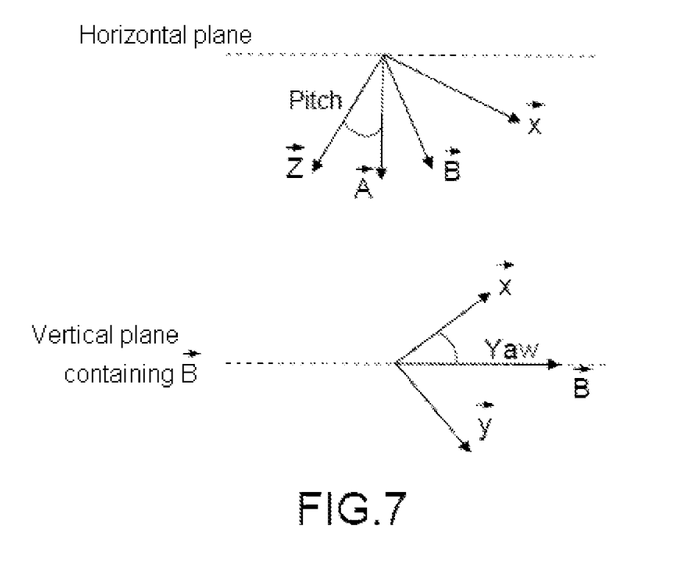
FIG. 7 illustrates Euler angles of yaw, pitch, roll that are used in relation to a magnetic field and a gravitational field.

The Euler angles (yaw, pitch, roll) are used. The pitch, roll and yaw angles are represented in FIG. 7, in which are represented the magnetic field $\vec{B}$ and the gravitational field $\vec{A}$.

The yaw angle indicates the direction or heading of the bicycle relative to magnetic north, and the pitch angle gives the inclination of the bicycle relative to the horizontal plane, or slope of the rolling surface.

The Euler angles (yaw, pitch, roll) are calculated on the basis of the measurements of the magnetic field $\vec{B}$ and of the gravitational field $\vec{A}$ at the instant T, on the knowledge of an initial orientation of these fields $\vec{b_0}$ and $\vec{a_0}$, and on possible corrections of the magnetic field and acceleration disturbances.

In practice, the bicycle may contain ferromagnetic materials that are sources of a magnetic field which disturbs the measurement of the magnetometer M, resulting in an error in the calculation of the Euler angles.

Hereinafter in the description, the convention used is a convention of direct angles, corresponding to the rotations of the vectors $\vec{A}$ and $\vec{B}$ in the coordinate system ($\vec{x}$, $\vec{y}$, $\vec{z}$) linked to the magnetometer M.

Below is an exemplary embodiment of the first module CORR1 for correcting the signals from the measurement axes supplied by said magnetometer M based on an estimation of the magnetic disturbances due to the bicycle.

In order to calculate these disturbances, it is desirable to perform a preliminary calibration before any angle calculations.

It is possible to perform a calibration based on four measurements, the cell phone TP integrating a magnetometer M being fastened onto the bicycle. The bicycle is then placed on a flat and fixed surface.

The magnetometer M is first calibrated in the absence of any magnetic disturbance, for example by a method of Merayo type. The method consists in slowly rotating the magnetometer M about each axis, facing north.

The four measurements are performed as follows:

a measurement of the acceleration $\vec{A}_n(A_{n1},A_{n2},A_{n3})$ and of the magnetic field $\vec{M}n(M_{n1},M_{n2},M_{n3})$ with the axis x of the magnetometer M oriented in the direction of magnetic north;

a measurement of the magnetic field $\vec{M}s(M_{s1},M_{s2},M_{s3})$ with the axis x of the magnetometer M oriented in the direction of magnetic south;

a measurement of the magnetic field $\vec{M}s(M_{o1},M_{o2},M_{o3})$ with the axis x of the magnetometer M oriented in the direction of magnetic west; and a measurement of the magnetic field $\vec{M}e(M_{e1},M_{e2},M_{e3})$ with the axis x of the magnetometer M oriented in the direction of magnetic east.

Now:

$$\vec{a_0} = \begin{bmatrix} \sin(\text{Pitch}) \\ 0 \\ \cos(\text{Pitch}) \end{bmatrix}$$

$$\vec{b_0} = \begin{bmatrix} \cos(\text{alpha}) \\ 0 \\ \sin(\text{alpha}) \end{bmatrix}$$

and alpha is the angle between the terrestrial magnetic field vector and the horizontal plane, and is 60°.

Furthermore, the following relationship applies:

$$\vec{B}_{meas} = R \cdot \vec{b_O} + \vec{B_r} + M_f \cdot R \cdot \vec{b_O}.$$

in which:

$$R = \begin{bmatrix} \cos(\text{Pitch}) \times \cos(\text{Yaw}) & -\cos(\text{Pitch}) \times \sin(\text{Yaw}) & \sin(\text{Pitch}) \\ \sin(\text{Yaw}) & \cos(\text{Yaw}) & 0 \\ -\sin(\text{Pitch}) \times \cos(\text{Yaw}) & \sin(\text{Pitch}) \times \sin(\text{Yaw}) & \cos(\text{Pitch}) \end{bmatrix}$$

$\vec{B}_{meas}$ represents the measured magnetic field,

R represents the rotational matrix making it possible to switch from the initial orientation described by the vectors $\vec{a_O}$ and $\vec{b_O}$ to the current orientation of the sensors described by the yaw, pitch and roll rotation angles, $\vec{B_r}$ represents the residual magnetic field linked to the bicycle, which is superposed on the earth's magnetic field, and G represents a gain, representative of the influence of the orientation of the ferromagnetic materials in the earth's magnetic field, and $\vec{a_O}$ and $\vec{b_O}$ are the fields respectively measured by the accelerometer A and the magnetometer M when the axis x of the magnetometer M is horizontal and directed toward magnetic north, and the axis z is vertical according to the gravitational field.

It is then desirable to determine:

$$G = \begin{bmatrix} G_{11} & G_{12} & G_{13} \\ G_{21} & G_{22} & G_{23} \\ G_{31} & G_{32} & G_{33} \end{bmatrix}$$

$$\vec{B_r} = \begin{bmatrix} B_{r1} \\ B_{r2} \\ B_{r3} \end{bmatrix}$$

of components in the coordinate system linked to the bicycle and to the magnetometer M fixed relative to the bicycle.

By solving the system, and by positing Pitch=P=a sin($A_{n1}$), the following is obtained:

$$G_{12} = \frac{Mo_1 - Me_1}{2\cos(\text{alpha})}$$

$$G_{22} = \frac{Mo_2 - Me_2}{2\cos(\text{alpha})} - 1$$

$$G_{32} = \frac{Mo_3 - Me_3}{2\cos(\text{alpha})}$$

$$G_{13} = \frac{Mn_1 + Ms_1 - Mo_1 - Me_1}{2\sin(\text{alpha} - P)}$$

$$G_{11} = \frac{Mn_1 - Ms_1 - 2\cos(\text{Pitch}) \times \cos(\text{alpha}) + 2\sin(P) \times \cos(\text{alpha}) * G_{13}}{2\cos(P) \times \cos(\text{alpha})}$$

$$G_{23} = \frac{Mn_2 + Ms_2 - Mo_2 - Me_2}{2\sin(\text{alpha} - P)}$$

$$G_{21} = \frac{Mn_2 - Ms_2 + 2\sin(P) \times \cos(\text{alpha}) \times G_{23}}{2\cos(P) \times \cos(\text{alpha})}$$

$$G_{33} = \frac{Mn_3 + Ms_3 - Mo_3 - Me_3}{2\sin(\text{alpha} - P)}$$

$$G_{31} = \frac{Mn_3 - Ms_3 + 2\sin(P) \times \cos(\text{alpha}) + 2\sin(P) \times \cos(\text{alpha}) \times G_{33}}{2\cos(P) \times \cos(\text{alpha})}$$

and $$B_{r1} = Mo_1 - \sin(\text{alpha}) \times \sin(P) - G_{11} \times \sin(\text{alpha}) \times \sin(P) - G_{12} \times \cos(\text{alpha}) + G_{13} \times \sin(\text{alpha}) \times \cos(P)$$

$$B_{r2} = Mo_2 - \cos(\text{alpha}) - G_{21} \times \sin(\text{alpha}) \times \sin(P) - G_{22} \times \cos(\text{alpha}) + G_{23} \times \sin(\text{alpha}) \times \cos(P)$$

$$B_{r3} = Mo_3 - \sin(\text{alpha}) \times \cos(P) - G_{31} \times \sin(\text{alpha}) \times \sin(P) - G_{32} \times \cos(\text{alpha}) + G_{33} \times \sin(\text{alpha}) \times \cos(P)$$

This additional calibration need be performed only once for a bicycle and a position of the magnetometer on the bicycle. The calculated data are stored in a configuration file, which can be subsequently reused.

The correction of the measured magnetic field $\vec{B}_{meas}$ is then performed as follows:

$\vec{B} = (I+G)^{-1} \cdot (\vec{B}_{meas} - \vec{B}_r)$, $\vec{B}$ being the corrected magnetic field, $\vec{B}_{meas}$ the magnetic field actually measured, and I the identity matrix of the dimension 3.

As a variant, this calibration can be done on the basis of a circular movement of the user of the bicycle. The user makes the bicycle describe a complete circle, then a lateral rocking movement from left to right, in one or more different directions, so as to use a plurality of different orientations.

The second module CORR2 for correcting the signals from the measurement axes supplied by the accelerometer A, based on an estimation of the specific acceleration of the bicycle, may make it possible to enhance the accuracy by compensating the disturbances linked to the specific acceleration of the bicycle.

In practice, since the bicycle is moving, the acceleration measured by the accelerometer A is the sum of the gravity and of the specific acceleration of the bicycle. Determining the specific acceleration of the bicycle makes it possible to know the position of the gravity vector in the coordinate system linked to the accelerometer A (the coordinate systems of the magnetometer M and of the accelerometer A are either the same, or linked by a rotation matrix known by calibration), because it is the gravity vector which is used in calculating the Euler angles. For example, the specific acceleration is determined by estimation, based on a prior steady state, in which the measured acceleration corresponds only to gravity.

The Euler angles can, for example, be calculated by known calculations, for example mentioned in the book "Quaternions and Rotations Sequences", Ed Princeton, by J. B. Kuipers, in which the quaternion, then the rotation matrix, and finally the Euler angles associated with the rotational movements of the accelerometer A and of the magnetometer M and therefore of the bicycle, in space.

An average of the yaw angle and pitch angle values on the wheel travel corresponding to the minimum magnetic disturbance on the part of the magnet, i.e. approximately three quarters of a wheel revolution.

Figure 8:
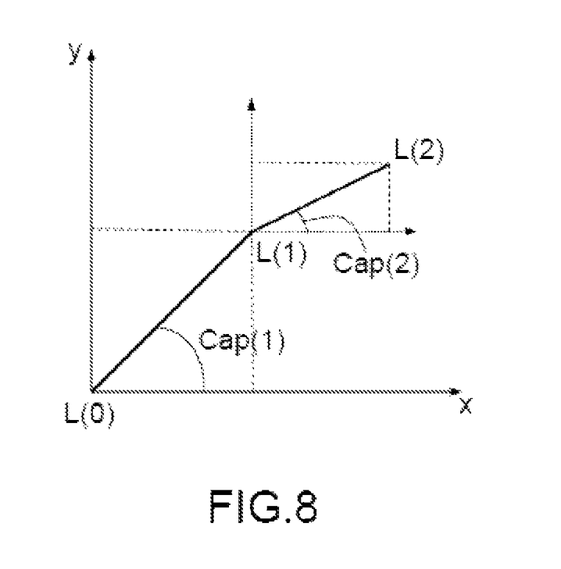
FIG. 8 illustrates managing displaying of a change of position of a vehicle on the map.

When the system is provided with a display screen and a cartographic device, notably to guide the user, the display of the change of position of the bicycle on the map can be managed as follows, with reference to FIG. 8.

Each wheel R revolution has a corresponding point L(n) representing the location of the bicycle on the map, n being an index representing the number of wheel R revolutions completed since the point of departure. It is then possible to plot the location of the cyclist on an interactive map of the cartographic device. The point of departure of the cyclist, O(xi, yi), is a priori known, and the switch is made from the point L(n) of coordinates (x(n), y(n)) to the point L(n+1) of coordinates (x(n+1), y(n+1)) by the following relationships (n≥0):

$$\begin{cases} x(n+1) = x(n) + \dfrac{WheelPerim \times \cos(heading(n)) \times \cos(slope(n))}{MapScale} \\ y(n+1) = y(n) + \dfrac{WheelPerim \times \sin(heading(n)) \times \cos(slope(n))}{MapScale} \end{cases}$$

with:

$$\begin{cases} x(0) = x_i \\ y(0) = y_i \end{cases}$$

in which:

WheelPerim represents the perimeter of the wheel R, in m,
heading(n) represents the heading of the bicycle on the $n^{th}$ revolution of the wheel R, in degrees,
slope(n) represents the slope of the rolling surface on the $n^{th}$ revolution of the wheel R, in m, and
MapScale represents the scale of the map, in m/pixel.

The placement on the displayed map, the coordinates are used by observing the following relationships:

$$\begin{cases} x_c(n) = \dfrac{x(n)\cos(MapAngle) - y(n)\sin(MapAngle)}{MapScale} \\ y_c(n) = \dfrac{x(n)\sin(MapAngle) + y(n)\cos(MapAngle)}{MapScale} \end{cases}$$

in which map angle represents the orientation of the map relative to magnetic north, in degrees.

The map scale parameter makes it possible to convert meters into pixels, according to the scale of the map, so as to correctly position the placement of the cyclist on the map, the position being displayed in effect at the display screen pixel level.

The orientation of the map relative to magnetic north can also be taken into account. To this end, a rotation of the position vector L(x(n), y(n)) of the Map Angle angle is performed by means of a matrix rotation:

$$\begin{bmatrix} x_r(n) \\ y_r(n) \end{bmatrix} = \begin{bmatrix} \cos(MapAngle) & -\sin(MapAngle) \\ \sin(MapAngle) & \cos(MapAngle) \end{bmatrix} \begin{bmatrix} x(n) \\ y(n) \end{bmatrix}$$

The knowledge of the slope of the rolling surface of the bicycle allows for the representation on a flat map, in which the concept of altitude is absent, and makes it possible to reflect changes of level by the cyclist. Thus, over time the itinerary covered, the position of the cyclist relative to his or her point of departure is always known.

The present invention enables a user of a biomechanically-driven vehicle comprising at least one wheel, for example a bicycle, to be assisted in the driving thereof, by consuming very little energy, which makes it possible to significantly increase the autonomy of the system.

The services provided to the driver may be, alone or in combination, guidance from a point of departure to a point of arrival, the supply of information regarding the route covered or the drive, in real time or after the event, driving advice, for example an analysis of the swings of a cyclist, or even the recognition of a fall.

The claimed invention is:

1. A system for assisting a driver of a bicycle comprising a biomechanical drive, the system comprising:
    a magnetometer with at least two measurement axes supplying data for determining a heading of the bicycle;
    first means for determining a speed of the bicycle using said magnetometer, said wheel of the bicycle being provided with a magnetic signature representative of a perimeter of said wheel;
    second means for determining the heading of the bicycle using said magnetometer; and
    means for supplying information relating to a movement of the bicycle, based on the speed of the bicycle and the heading of the bicycle.

2. The system as claimed in claim 1, wherein said second determination means is further configured to determine a slope of the rolling surface, and said means for supplying information relating to a movement of the bicycle further utilizing a slope of a rolling surface.

3. The system as claimed in claim 1, wherein said first determination means utilizes said magnetometer and further comprises a magnetic means for creating the magnetic signature of said wheel of the bicycle.

4. The system as claimed in claim 3, wherein said magnetic means comprises at least one magnet provided with fastening means configured to couple to said wheel of the bicycle, in proximity to the rim.

5. The system as claimed in claim 4, wherein said first means for determining the speed of the bicycle comprises means for detecting spikes on signals from the measurement axes of said magnetometer, based on detections of local extrema of said measurement signals and on an amplitude threshold.

6. The system as claimed in claim 1, wherein said first means for determining the speed of the bicycle comprises means for learning or for recognizing the magnetic signature of said wheel of the bicycle.

7. The system as claimed in claim 1, wherein said means for supplying information relating to the movement of the bicycle comprises a cartographic device, said system also comprising third means for determining a point of departure and a point of arrival of the bicycle.

8. The system as claimed in claim 7, wherein said third determination means comprises a display screen, at least a stored geographic map, and means for the user to select points of departure and of arrival on said map.

9. The system as claimed in claim 7, wherein said third determination means comprises a receiver of data delivered by a satellite navigation system to determine a point of departure.

10. The system as claimed in claim 7, wherein said third determination means comprises a receiver of data delivered by a fixed device with short-distance transmission for determining a point of departure.

11. The system as claimed in one claim 1, wherein said first determination means further comprises first means for correcting signals from the measurement axes supplied by said magnetometer, based on an estimation of magnetic disturbances due to the bicycle.

12. The system as claimed in claim 1, wherein said second determination means comprises a triaxial accelerometer.

13. The system as claimed in claim 12, wherein said second determination means further comprises second means for correcting signals from measurement axes supplied by said accelerometer, based on an estimation of a specific acceleration of the bicycle.

14. The system as claimed in claim 1, further comprising an external device for fastening said system onto the bicycle in proximity to said wheel.

15. A cell phone comprising an integrated system as claimed in claim 1.

16. A method for assisting a driver of a bicycle, the method comprising:
    determining a speed of the bicycle based on measurements received from a magnetometer with at least two measurement axes, a wheel of the bicycle being provided with a magnetic signature representative of a perimeter of said wheel;
    determining a heading of the bicycle based on measurements received from said magnetometer; and
    supplying information relating to a movement of the bicycle, based on the speed of the bicycle and the heading of the bicycle.

17. The method as claimed in claim 16, further comprising determining a slope of a rolling surface, and wherein the supplying information relating to a movement of the bicycle is also based on the slope of the rolling surface.

18. A non-transitory computer-readable media comprising program code configured to perform the method of claim 16.

19. A kit comprising the non-transitory computer-readable media as claimed in claim 18, at least one magnet provided with a fastening means configured to couple with a wheel of a bicycle in proximity to a rim, and an external device for fastening onto the bicycle in proximity to said wheel.

* * * * *